United States Patent
Hong et al.

(10) Patent No.: US 8,860,691 B2
(45) Date of Patent: Oct. 14, 2014

(54) TOUCH SENSING APPARATUS AND METHOD THEREOF

(75) Inventors: Gyung Hee Hong, Seoul (KR); Sang Ho Lee, Gyunggi-do (KR); Yong Il Kwon, Gyunggi-do (KR); Tah Joon Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 185 days.

(21) Appl. No.: 13/346,063

(22) Filed: Jan. 9, 2012

(65) Prior Publication Data

US 2013/0106768 A1 May 2, 2013

(30) Foreign Application Priority Data

Oct. 27, 2011 (KR) ........................ 10-2011-0110644

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01)
USPC ...................................... 345/174; 178/18.06

(58) Field of Classification Search
None
See application file for complete search history.

(56) References Cited

U.S. PATENT DOCUMENTS

| | | | |
|---|---|---|---|
| 2009/0314621 A1 | 12/2009 | Hotelling | |
| 2011/0227863 A1* | 9/2011 | Cheng et al. | 345/174 |
| 2012/0056842 A1* | 3/2012 | Chang | 345/174 |
| 2012/0182252 A1* | 7/2012 | Brosnan et al. | 345/174 |
| 2012/0274601 A1* | 11/2012 | Shih et al. | 345/174 |

FOREIGN PATENT DOCUMENTS

| | | |
|---|---|---|
| KR | 10-2009-0082963 | 8/2009 |
| KR | 10-2011-0087758 | 8/2011 |

* cited by examiner

*Primary Examiner* — Adam R Giesy (57) ABSTRACT

There are provided a touch sensing apparatus and method. The touch sensing apparatus includes: a plurality of first electrodes; a plurality of second electrodes; and a controlling unit, wherein the controlling unit applies a first driving signal to at least one of the plurality of first electrodes, sequentially obtains sensed signals from the plurality of second electrodes intersecting with the at least one first electrode to which the first driving signal is applied, and applies a second driving signal having the same potential as that of the first driving signal to other second electrodes adjacent to the second electrode from which the controlling unit obtains the sensed signal while the controlling unit obtains the sensed signal from any one of the plurality of second electrodes.

13 Claims, 6 Drawing Sheets

PRIOR ART

TOUCH SENSING APPARATUS AND METHOD THEREOF

CROSS-REFERENCE TO RELATED APPLICATIONS

This application claims the priority of Korean Patent Application No. 10-2011-0110644 filed on Oct. 27, 2011, in the Korean Intellectual Property Office, the disclosure of which is incorporated herein by reference.

BACKGROUND OF THE INVENTION

1. Field of the Invention

The present invention relates to a touch sensing apparatus and method thereof that can accurately judge a touch through an increase in a magnitude of capacitance variations at the time of a touch.

2. Description of the Related Art

A touch sensing apparatus such as a touch screen, a touch pad, or the like, an input apparatus attached to a display apparatus to provide an intuitive input method to a user, has recently been widely used in various electronic devices such as portable phones, personal digital assistants (PDAs), navigation apparatuses, and the like. In particular, recently, with an increase in demand for smart phones, the rate at which touch screens have been adopted as touch sensing apparatus capable of providing various input methods in a limited form factor has increased on a day by day basis.

Touch screens used in portable devices may be divided into resistive type touch screens and capacitive type touch screens, according to a method of sensing a touch. The capacitive type touch screen has advantages in that it has a relatively long lifespan and various input methods and gestures may be easily implemented therein, such that use thereof has markedly increased. Particularly, a multi-touch interface may be more easily implemented using the capacitive type touch screen, as compared to the resistive type touch screen, such that it is widely used in devices such as smart phones, and the like.

The capacitive type touch screen judges whether or not a touch is made by sensing a variation in capacitance generated by a touch. As a variation in a magnitude of capacitance increases, the touch may be more accurately judged. In order to increase the magnitude of capacitance variations, a high voltage driver may be used. However, in this case, a high voltage process and an additional circuit charge pump for forming a high voltage driving signal are required, such that complexity of a circuit increases. Therefore, it may not be easy to implement the capacitive type touch screen, and implementing the capacitive type touch screen in an economical manner may be problematic.

SUMMARY OF THE INVENTION

An aspect of the present invention provides a touch sensing apparatus and method thereof that can be implemented at low cost and accurately judge a touch by receiving a large magnitude of capacitance variations without using a high voltage driving signal.

According to an aspect of the present invention, there is provided a touch sensing apparatus including: a plurality of first electrodes; a plurality of second electrodes intersecting with the plurality of first electrodes; and a controlling unit connected to the plurality of first electrodes and the plurality of second electrodes, wherein the controlling unit applies a first driving signal to at least one of the plurality of first electrodes, sequentially obtains sensed signals from the plurality of second electrodes intersecting with the at least one first electrode to which the first driving signal is applied, and applies a second driving signal having the same potential as that of the first driving signal to other second electrodes adjacent to a second electrode from which the controlling unit obtains the sensed signal while the controlling unit obtains the sensed signal from any one of the plurality of second electrodes.

The first and second driving signals are identical in terms of at least one of a phase and a frequency.

The controlling unit may include a first circuit generating the first and second driving signals, and a second circuit obtaining the sensed signals.

The first circuit may be connected to the plurality of first electrodes and the plurality of second electrodes, and the second circuit may be connected to the plurality of second electrodes.

The controlling unit may obtain variations in capacitance generated between the at least one first electrode to which the first driving signal is applied and the second electrodes intersecting with the at least one first electrode to which the first driving signal is applied as the sensed signals.

The controlling unit may judge a touch by providing a predetermined weighting average to each of the sensed signals.

The controlling unit may judge at least any one of coordinates of the touch, movements of the touch, and a number of touches.

According to another aspect of the present invention, there is provided a touch sensing method including: applying a first driving signal to at least one of a plurality of first electrodes; sequentially obtaining sensed signals from a plurality of second electrodes intersecting with the at least one first electrode to which the first driving signal is applied; and judging a touch based on the sensed signals, wherein, in the obtaining of the sensed signals, a second driving signal having the same potential as that of the first driving signal is applied to other second electrodes adjacent to a second electrode from which the sensed signal is obtained while the sensed signal is obtained from any one of the plurality of second electrodes.

The first and second driving signals are identical in terms of at least one of a phase and a frequency.

In the obtaining of the sensed signals, variations in capacitance generated between the at least one first electrode to which the first driving signal is applied and the second electrodes intersecting with the at least one first electrode to which the first driving signal is applied may be obtained as the sensed signals.

In the judging of the touch, the touch may be judged by providing a predetermined weighting average to each of the sensed signals.

In the judging of the touch, at least any one of coordinates of the touch, movements of the touch, and a number of touches may be judged.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will be described in detail with reference to the accompanying drawings. These embodiments will be described in detail in order to allow those skilled in the art to practice the present invention. It should be appreciated that various embodiments of the present invention are different, but are not necessarily exclusive. For example, specific shapes, configurations, and characteristics described in an embodiment of the present invention may be implemented in another embodiment without departing from the spirit and the scope of the present invention. In addition, it should be understood that positions and arrangements of individual components in each disclosed embodiment maybe changed without departing from the spirit and the scope of the present invention. Therefore, the detailed description provided below should not be construed as being restrictive. In addition, the scope of the present invention is defined only by the accompanying claims and their equivalents if appropriate. Similar reference numerals will be used to describe elements having the same or similar functions throughout the accompanying drawings.

Hereinafter, embodiments of the present invention will be described in detail with reference to the accompanying drawings so that those skilled in the art may easily practice the present invention.

Figure 1:
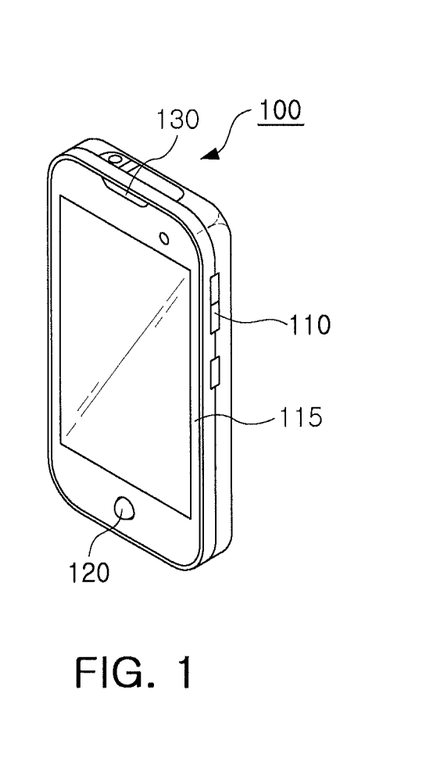
FIG. 1 is a view showing an electronic device to which a touch sensing apparatus according to an embodiment of the present invention is applicable.

FIG. 1 is a view showing an electronic device to which a touch sensing apparatus according to an embodiment of the present invention is applicable. Referring to FIG. 1, an electronic device 100 according to the present embodiment may include a display apparatus 110 for outputting an image, an input unit 120, an audio unit 130 for outputting audio, and a touch sensing apparatus integrated with the display apparatus 110.

As shown in FIG. 1, in the case of a mobile apparatus, the touch sensing apparatus is generally provided integrally with the display device, and needs to have high light transmissivity enough to transmit the image displayed by the display apparatus. Therefore, the touch sensing apparatus may be implemented by forming a sensing electrode using a transparent and electrically conductive material such as indium tin oxide (ITO), indium zinc oxide (IZO), zinc oxide (ZnO), carbon nano tube (CNT), or graphene on a base substrate formed of a transparent film material such as polyethylene telephtalate (PET), polycarbonate (PC), polyethersulfone (PES), polyimide (PI), or the like. The display apparatus may include a wiring pattern disposed in a bezel area 115 thereof, wherein the wiring pattern is connected to the sensing electrode formed of the transparent conductive material. Since the wiring pattern is visually shielded by the bezel area 115, it may be formed of a metal material such as silver (Ag), copper (Cu), or the like.

In the case in which the touch sensing apparatus according to the embodiment of the present invention needs not to be provided integrally with the display apparatus as in a touch pad of a notebook computer, or the like, the touch sensing apparatus may also be manufactured by simply patterning the sensing electrode using a metal on a circuit board. However, for convenience of explanation, the touch sensing apparatus and method according to the embodiment of the present invention will be described based on the touch screen.

Figure 2:
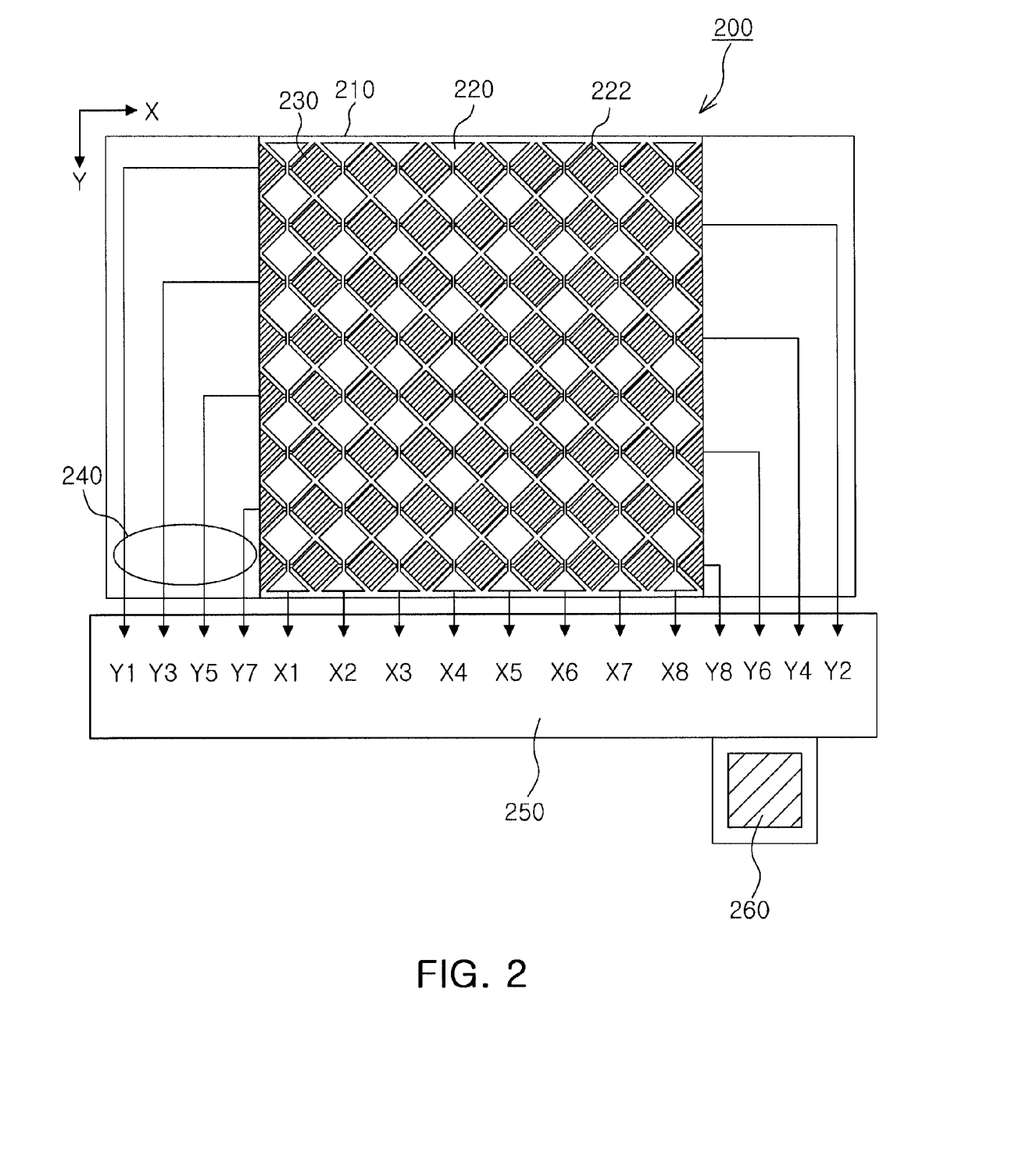
FIG. 2 is a view showing a structure of a touch sensing apparatus according to an embodiment of the present invention.

FIG. 2 is a view showing a structure of a touch sensing apparatus according to an embodiment of the present invention; Referring to FIG. 2, a touch sensing apparatus 200 according to the present embodiment may include a base substrate 210 formed of a transparent material, a plurality of electrodes 220 and 230 formed on the base substrate 210, a wiring pattern 240 connected to the plurality of electrodes 220 and 230, and a controlling unit 260 electrically connected to the plurality of electrodes 220 and 230 through the wiring pattern 240. As shown in FIG. 2, a circuit board 250 having the controlling unit 260 mounted thereon may be attached to a lower end portion of the base substrate 210 by anisotropic conductive film (ACF) bonding, or the like, and a bonding pad formed by extending the wiring pattern 240 is provided on the lower end portion of the base substrate 210, whereby each sensing channel terminal of the controlling unit 260 may be electrically connected to the plurality of electrodes 220 and 230 through the wiring pattern 240.

The plurality of electrodes 220 and 230 may be formed of a transparent conductive material ITO, ZnO, IZO, CNT, or the like, as described above, and may have a predetermined pattern so that the controlling unit 260 may judge touches based on sensed signals generated in the plurality of electrodes 220 and 230. The plurality of electrodes 220 and 230 shown in FIG. 2 may have a rhombus or diamond pattern, and unit electrodes 222 having a rhombus or diamond shape are connected to each other in a horizontal or vertical direction to form the plurality of electrodes 220 and 230. Hereinafter, for convenience of explanation, the electrodes 230 extended in the horizontal direction among the plurality of electrodes 220 and 230 will be referred to as first electrodes, and the other electrodes 220 extended in the vertical direction will be referred to as second electrodes.

All of the first and second electrodes 230 and 220 may include the unit electrodes 222 having the rhombus or diamond shape and extended in the horizontal or vertical direction, and may be disposed on different layers or the same layer. Each space between the first electrodes 230 is filled with the second electrode 220. In the case in which both of the first and second electrodes 230 and 220 are disposed on the same layer, a bridge structure in which a predetermined insulating material is disposed at an intersection point between the first and second electrodes 230 and 220 may be used in order to electrically separate the first and second electrodes from each other at the intersection point.

The first and second electrodes 230 and 220 may be connected to separate wiring patterns, respectively, as shown in FIG. 2. That is, as shown in FIG. 2, in the case in which eight first electrodes 230 and eight second electrodes 220 are included in the touch sensing apparatus 200, a total of sixteen wiring patterns 240 may be prepared along the bezel area of the base substrate 210, and the controlling unit 260 may include at least sixteen sensing channels so as to be connected to the respective wiring patterns 240.

The controlling unit 260 maybe electrically connected to the plurality of electrodes 220 and 230 through the sensing channels and the respective wiring patterns 240 and include a sensing circuit for obtaining sensed signals. The sensed signal may be an electrical signal indicating a variation in self-capacitance generated between a touching object and each of the first and second electrodes 230 and 220 or a variation in mutual-capacitance generated between the first and second electrodes 230 and 220 due to the touching object. Particularly, in the case in which the variation in mutual-capacitance is sensed, a driving circuit for applying a driving signal to at least one of the first and second electrodes 230 and 220 may be included in the controlling unit 260.

As an example, the controlling unit 260 may measure variations in capacitance generated in the plurality of electrodes 220 and 230 in a form of voltage. The variation in capacitance measured as a voltage magnitude may be converted into a digital signal by an analog-to-digital converter (ADC) or a time-to-digital converter (TDC), and the controlling unit 260 may judge coordinates, multi-touches, movements, or the like, of the applied touch using the converted digital signal.

Figure 3:
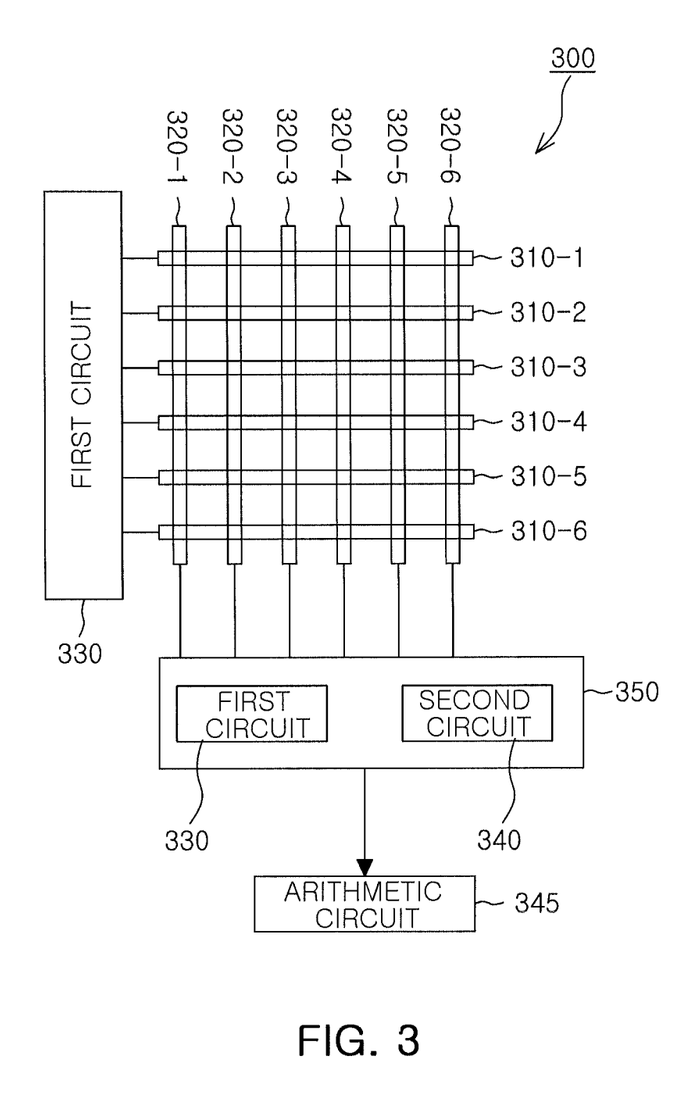
FIGS. 3 and 4 are views describing a method of judging a touch in a touch sensing apparatus according to an embodiment of the present invention.

FIG. 3 is a view describing a method of judging a touch in a touch sensing apparatus according to an embodiment of the present invention. Referring to FIG. 3, a controlling unit 350 may include first and second circuits 330 and 340, wherein the first circuit 330 generates driving signals and the second circuit 340 obtains sensed signals. First electrodes 310-1 to 310-6 extended in a horizontal direction may be connected to the first circuit 330, and second electrodes 320-1 to 320-6 extended in a vertical direction may be connected to the first and second circuits 330 and 340. Although the first circuit 330 connected to the first electrodes 310-1 to 310-6 and the first circuit 330 connected to the second electrodes 320-1 to 320-6 maybe the same circuit, they are separately shown in FIG. 3 for convenience of explanation.

Hereinafter, an operation mechanism of the touch sensing apparatus shown in FIG. 3 will be described. The controlling unit 350 may apply a first driving signal generated in the first circuit 330 to at least one of the first electrodes 310-1 to 310-6 and apply a second driving signal that is substantially the same as the first driving signal applied to at least one of the first electrodes 310-1 to 310-6 to other second electrodes 320-1 to 320-6 adjacent to target second electrodes 320-1 to 320-6 to be sensed during the application of the first driving signal.

Here, the signal that is substantially the same as any signal maybe a signal having the same potential as that of any signal, and the signal having the same potential as that of any signal may be a signal of which at least one of a frequency and a phase is the same as that of any signal and most preferably, a signal of which all of a frequency, a phase, and a level are the same as those of any signal.

For example, when it is assumed that a driving signal is applied to at least one 310-1 of the first electrodes and a target second electrode to be sensed is a second electrode 320-2 next to a second electrode 320-1 positioned in a leftmost portion, the signal that is substantially the same as the driving signal may be applied to other second electrodes 320-1 and 320-3 adjacent to the target second electrode 320-2 to be sensed.

During the application of the first driving signal, the second circuit 340 may obtain variations in capacitance generated between at least one first electrode 310-1 to which the driving signal is applied and the second electrodes 320-1 to 320-6 intersecting with the at least one first electrode 310-1 to which the driving signal is applied as sensed signals. An arithmetic circuit 345 may judge touches using the sensed signals obtained by the second circuit 340.

Here, the controlling unit 350 may judge the touch by providing a predetermined weighting average to each of the sensed signals. The controlling unit 350 may judge at least any one of coordinates of the touch, movements during the touch, and a number of touches.

Hereinafter, an operation of the touch sensing apparatus according to an embodiment of the present invention will be described in more detail with reference to FIG. 4.

Figure 4:
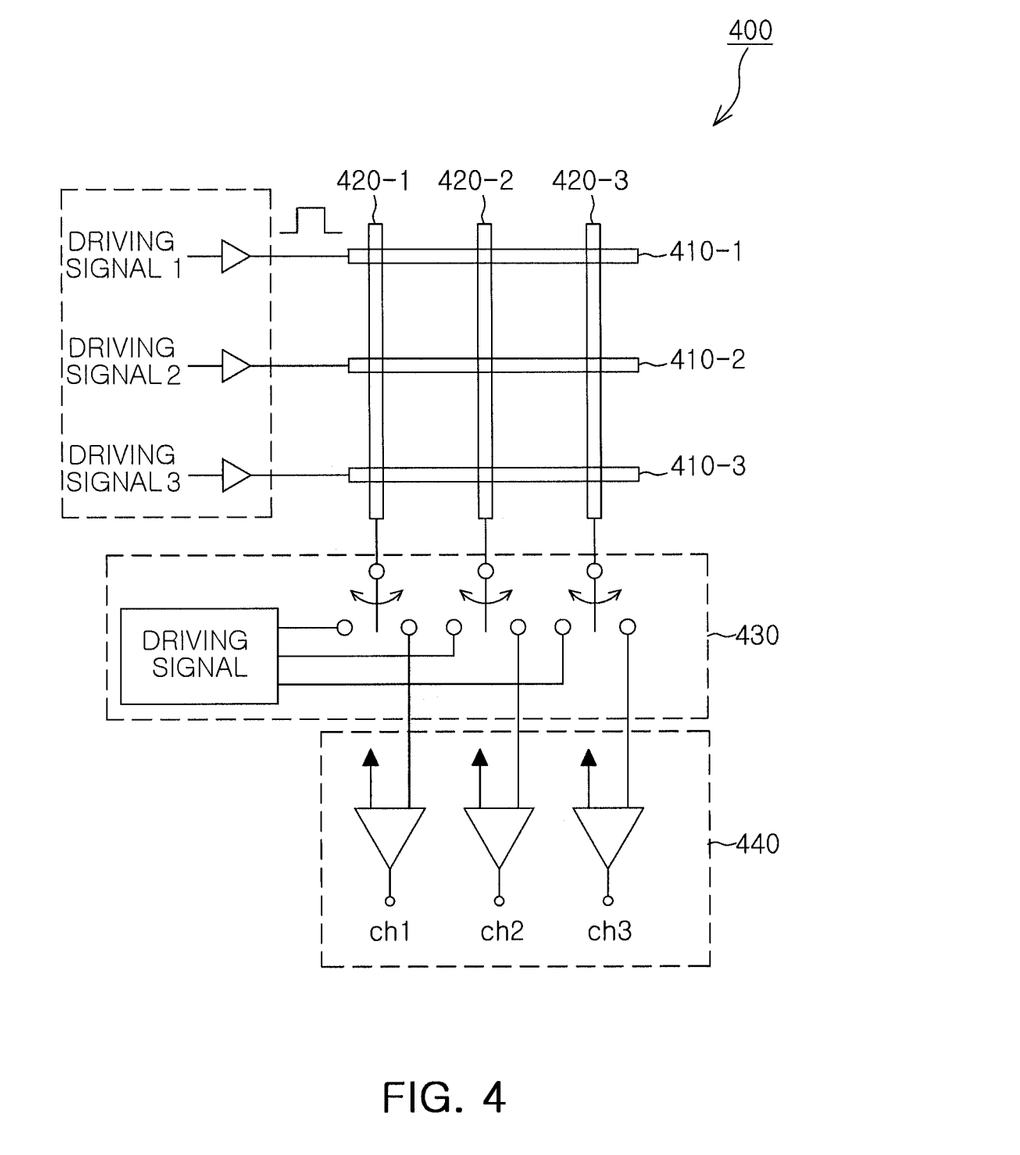

FIG. 4 is a view describing a method of judging a touch in a touch sensing apparatus according to an embodiment of the present invention. Referring to FIG. 4, the operation of the touch sensing apparatus according to the present embodiment starts with applying a driving signal to at least one of first electrodes 410-1 to 410-3. Hereinafter, it is assumed that the driving signal is applied to a first electrode 410-1 positioned in an uppermost portion for convenience of explanation.

When a second electrode 420-2 next to a second electrode 420-1 positioned in a leftmost portion among second electrodes 420-1 to 420-3 is a target second electrode to be sensed, a signal that is substantially the same as the driving signal is applied to other second electrodes 420-1 and 420-3 adjacent to the target second electrode 420-2 through a first circuit 430. When the signal that is substantially the same as the driving signal is applied to the second electrodes 420-1 and 420-3 adjacent to the target second electrode 420-2, a potential difference is not generated between the first electrode 410-1 to which the driving signal is applied and the second electrodes 420-1 and 420-3 adjacent to the target second electrode 420-2. Therefore, charges supplied to the first electrode 410-1 by the driving signal may only move to the target second electrode 420-2.

A second circuit 440 including an integrator may obtain a sensed signal according to a magnitude of capacitance variations due to the movement of the charges between the first electrode 410-1 to which the driving signal is applied and the second electrodes 420-1 to 420-3 intersecting with the first electrode 410-1 to which the driving signal is applied as described above.

As a result, the movement of a relatively large charge occurs due to the same driving signal, whereby the strength of the sensed signal may be increased.

Meanwhile, a time at which the signal that is substantially the same as the driving signal is applied to the second electrodes 420-1 and 420-3 adjacent to the target second electrode 420-2 may be synchronized with a time at which the target second electrode 420-2 is connected to the integrator of the second circuit 440. That is, while the second electrode 420-2 is connected to the integrator of the second circuit 440 and the variation in capacitance generated in the second electrode 420-2 is measured by the integrator, at least one of the second electrodes 420-1 and 420-3 may be connected to a driving signal node rather than the integrator to thereby receive a signal having the same potential as that of the driving signal applied to the first electrode 410-1. As an example, while the second electrode 420-2 is connected to the integrator, a switching timing may be controlled so that only the second electrode 420-3 positioned to the right of the second electrode 420-2 is connected to the driving signal node or both of the second electrodes 420-1 and 420-3 adjacent to the second electrode 420-2 are connected to the driving signal node.

Figure 5A:
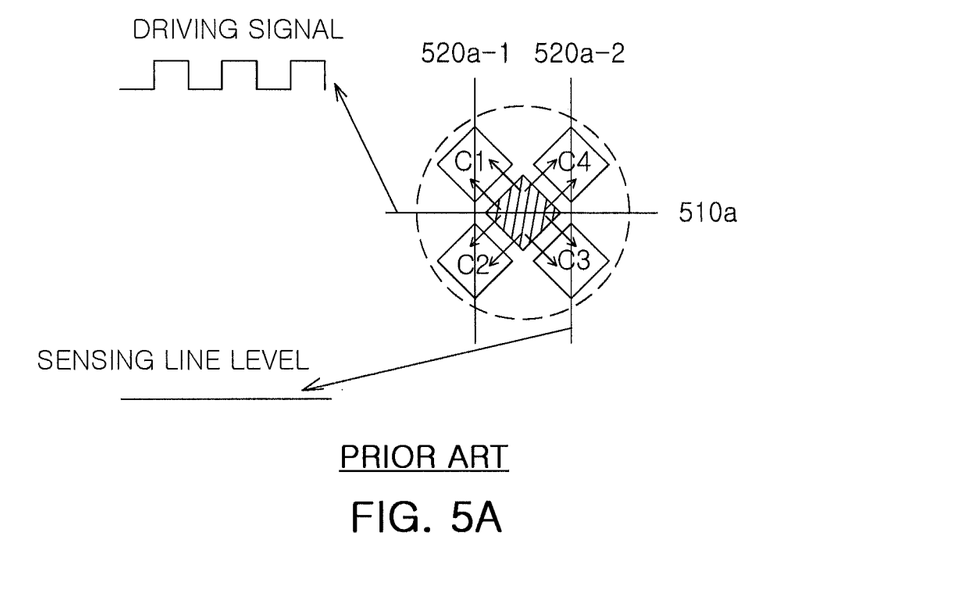
FIGS. 5A and 5B are, respectively, views describing movement of charges at the time of a touch according to the related art and an embodiment of the present invention.
Figure 5B:
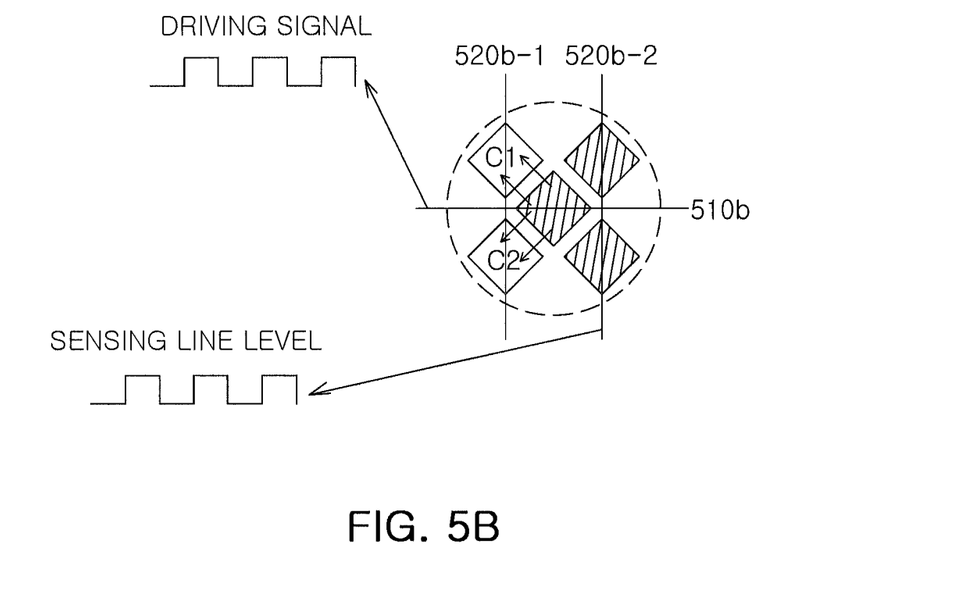

FIGS. 5A and 5B are, respectively, views describing movement of charges at the time of a touch according to the related art and the embodiment of the present invention. FIG. 5A shows the movement of the charges according to the related art; and FIG. 5B shows the movement of the charges according to the embodiment of the present invention. According to FIG. 5A, when a driving signal is applied to a first electrode 510a, charges move due to a potential difference between the first electrode 510a and second electrodes 520a-1 and 520a-2. These charges are transferred not only to the target second electrode 520a-1 to be sensed but also to the other second electrode 520a-1 adjacent thereto. C1 and C2 indicate the charges moving to the target second electrode 520a-1 to be sensed, and C3 and C4 indicate the charges moving to the other second electrode 520a-2 adjacent to the target second electrode 520a-1.

Therefore, the strength of a sensed signal is deteriorated due to the movement of the charges to the other second electrode 520a-2 other than the target second electrode 520a-1 to be actually sensed.

According to FIG. 5B, a driving signal is applied to a first electrode 510b, and a signal that is substantially the same as the driving signal is applied to a second electrode 520b-2 adjacent to a target second electrode 520b-1 to be sensed. At this time, charges move due to a potential difference. However, the charges move only to the target second electrode 520b-1 to be sensed unlike the scheme shown in FIG. 5A. Since a potential difference is not present between the first electrode 510b and the second electrode 520b-2 adjacent to the target second electrode 520b-1, the charges do not move to the second electrode 520b-2. C1 and C2 indicate the charges moving to the target second electrode 520b-1 to be sensed.

In the case of FIG. 5B, the overall charge supplied by the driving signal is the same as that of the scheme according to the related art described above with reference to FIG. 5A. However, in the case of FIG. 5B, since the charges move only to the target second electrode 520b-1 to be sensed, variations in capacitance are relatively increased, whereby a sensed signal having high strength may be obtained. The strength of the sensed signal is increased and a touch is judged therefrom, whereby the touch may be accurately judged under the same condition.

Here, at least one of phases and frequencies of the driving signal and a sensing line level of FIG. 5B may be the same as each other. Furthermore, all of the phases, the frequencies, and levels of the driving signal and the sensing line level of FIG. 5B may be the same as each other. When the first driving signal is a square wave signal, the second driving signal may be a sine wave signal, wherein the two signals need to have the same frequency.

Figure 6:
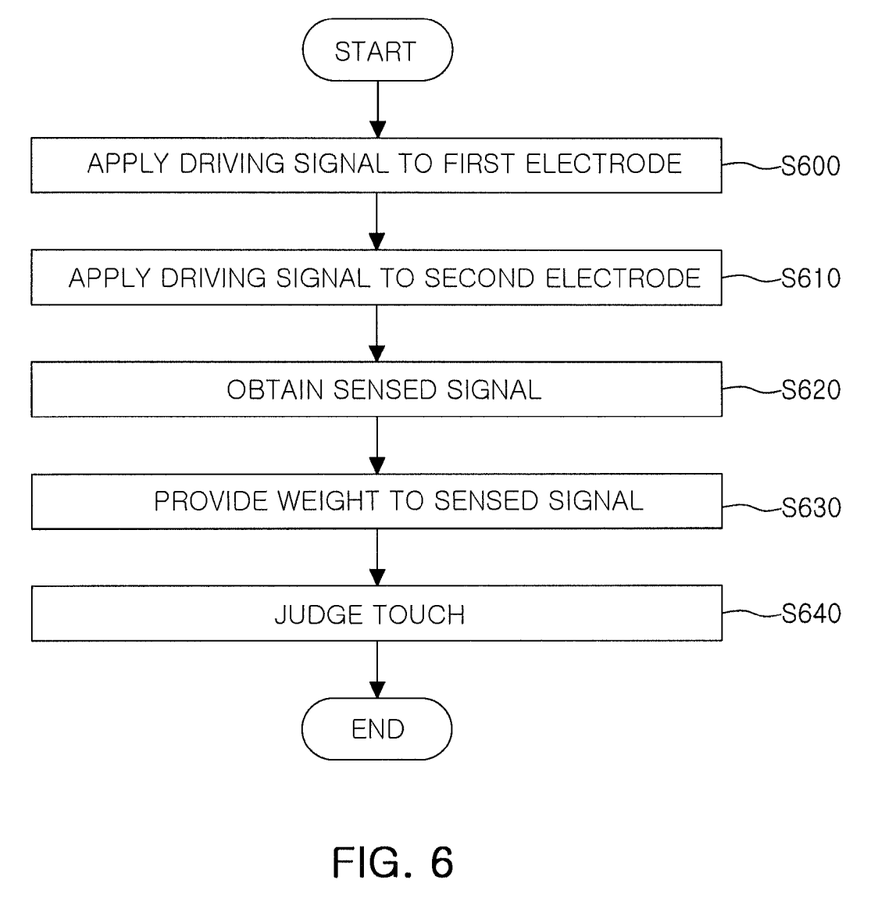
FIG. 6 is a flowchart describing a touch sensing method according to an embodiment of the present invention.

FIG. 6 is a flowchart describing a touch sensing method according to an embodiment of the present invention. Referring to FIG. 6, the touch sensing method according to the embodiment of the present invention starts with applying a driving signal to at least some of a plurality of first electrodes in a first circuit of a controlling unit (S600).

After the driving signal is applied to the at least some of the plurality of first electrodes, a signal that is substantially the same as the driving signal, preferably, a signal having the same potential as that of the driving signal is applied to other second electrodes adjacent to a target second electrode to be sensed among a plurality of second electrodes (S610). When the signal that is the same as the driving signal is applied to the second electrodes adjacent to the target second electrode, a potential difference between the second electrodes adjacent to the target second electrode and the first electrode to which the driving signal is applied is significantly reduced, whereby charges moving to the target second electrode to be sensed may be increased.

As described above, an operation of applying the signal that is substantially the same as the driving signal to the second electrodes adjacent to the target second electrode to be sensed may be controlled by a timing control using a switch. That is, while the target second electrode to be sensed is connected to an integrator for sensing a variation in capacitance, the second electrodes adjacent to the target second electrode are connected to a driving signal generating unit, such that a signal having the same potential as that of the driving signal applied to the first electrode, preferably, the same phase and frequency as those thereof, may be applied to the adjacent second electrodes.

The controlling unit obtains sensed signals from the target second electrode to be sensed (S620). Here, the sensed signals obtained by the controlling unit may be variations in capacitance generated between at least one first electrode to which the driving signal is applied and the second electrodes intersecting with the at least one first electrode to which the driving signal is applied. After the sensed signals are obtained, the controlling unit provides predetermined weights to the sensed signals (S630) and judges a touch based on the sensed signals to which the predetermined weights are provided (S640). In the operation of judging the touches, at least any one of coordinates of the touch, movements of the touch, and a number of touches may be judged.

As set forth above, according to embodiments of the present invention, a driving signal is applied and a signal that is substantially the same as the driving signal is applied to electrodes adjacent to a target electrode to be sensed to thereby increase an amount of charge moving to the target electrode, such that a variation in capacitance is increased at the time of a touch, whereby the touch may be accurately judged.

While the present invention has been shown and described in connection with the embodiments, it will be apparent to those skilled in the art that modifications and variations can be made without departing from the spirit and scope of the invention as defined by the appended claims.

What is claimed is:

1. A touch sensing apparatus comprising:
   a plurality of first electrodes;
   a plurality of second electrodes intersecting with the plurality of first electrodes; and
   a controlling unit connected to the plurality of first electrodes and the plurality of second electrodes,
   wherein the controlling unit applies a first driving signal to at least one of the plurality of first electrodes, sequentially obtains sensed signals from the plurality of second electrodes intersecting with the at least one of the plurality of first electrodes to which the first driving signal is applied, and applies a second driving signal having a same potential as that of the first driving signal to an other of the plurality of second electrodes adjacent to a second electrode of the plurality of second electrodes from which the controlling unit obtains a sensed signal while the controlling unit obtains the sensed signal from any one of the plurality of second electrodes.

2. The touch sensing apparatus of claim 1, wherein the first driving signal and the second driving signal are identical in terms of at least one of a phase and a frequency.

3. The touch sensing apparatus of claim 1, wherein the controlling unit includes:
   a first circuit generating the first driving signal and the second driving signal; and
   a second circuit obtaining the sensed signals.

4. The touch sensing apparatus of claim 3, wherein the first circuit is connected to the plurality of first electrodes and the plurality of second electrodes, and
   the second circuit is connected to the plurality of second electrodes.

5. The touch sensing apparatus of claim 1, wherein the controlling unit obtains variations in capacitance generated between the at least one of the plurality of first electrodes to which the first driving signal is applied and the plurality of second electrodes intersecting with the at least one of the plurality of first electrodes to which the first driving signal is applied as the sensed signals.

6. The touch sensing apparatus of claim 1, wherein the controlling unit judges a touch by providing a predetermined weighting average to each of the sensed signals.

7. The touch sensing apparatus of claim 6, wherein the controlling unit judges at least any one of coordinates of the touch, movements during the touch, and a number of touches.

8. The touch sensing apparatus of claim 1,
wherein the plurality of first electrodes are in a horizontal direction and the plurality of second electrodes are in a vertical direction or the plurality of first electrodes are in the vertical direction and the plurality of second electrodes are in the horizontal direction, and
wherein the controlling unit applies the second driving signal having the same potential as that of the first driving signal to the other of the plurality of second electrodes adjacent to the second electrode of the plurality of second electrodes from which the controlling unit obtains a sensed signal while the controlling unit applies the first driving signal to the plurality of first electrodes and obtains the sensed signal from the second electrode of the plurality of second electrodes.

9. A touch sensing method comprising:
applying a first driving signal to at least one of a plurality of first electrodes;
sequentially obtaining sensed signals from a plurality of second electrodes intersecting with the at least one of the plurality of first electrodes to which the first driving signal is applied; and
judging a touch based on the sensed signals,
wherein, in the obtaining of the sensed signals, a second driving signal having a same potential as that of the first driving signal is applied to an other of the plurality of second electrodes adjacent to a second electrode of the plurality of second electrodes from which a sensed signal is obtained while the sensed signal is obtained from any one of the plurality of second electrodes.

10. The touch sensing method of claim 9, wherein the first driving signal and the second driving signal are identical in terms of at least one of a phase and a frequency.

11. The touch sensing method of claim 9, wherein, in the obtaining of the sensed signals, variations in capacitance generated between the at least one of the plurality of first electrodes to which the first driving signal is applied and the plurality of second electrodes intersecting with the at least one of the plurality of first electrodes to which the first driving signal is applied are obtained as the sensed signals.

12. The touch sensing method of claim 9, wherein, in the judging of the touch, the touch is judged by providing a predetermined weighting average to each of the sensed signals.

13. The touch sensing method of claim 9, wherein, in the judging of the touch, at least any one of coordinates of the touch, movements of the touch, and a number of touches is judged.

* * * * *